United States Patent
Asahara et al.

(10) Patent No.: US 10,946,840 B2
(45) Date of Patent: Mar. 16, 2021

(54) WORK VEHICLE HAVING FENDER

(71) Applicant: KUBOTA CORPORATION, Osaka (JP)

(72) Inventors: Masato Asahara, Hyogo (JP); Brandon Mullins, Jefferson, GA (US)

(73) Assignee: KUBOTA CORPORATION, Osaka (JP)

( * ) Notice: Subject to any disclaimer, the term of this patent is extended or adjusted under 35 U.S.C. 154(b) by 140 days.

(21) Appl. No.: 16/406,672

(22) Filed: May 8, 2019

(65) Prior Publication Data

US 2020/0353899 A1   Nov. 12, 2020

(51) Int. Cl.
*B60S 5/00* (2006.01)
*B62D 25/18* (2006.01)
*B60K 35/00* (2006.01)
*B60J 11/06* (2006.01)
*B60S 9/18* (2006.01)

(52) U.S. Cl.
CPC .......... *B60S 5/00* (2013.01); *B60J 11/06* (2013.01); *B60K 35/00* (2013.01); *B60S 9/18* (2013.01); *B62D 25/18* (2013.01)

(58) Field of Classification Search
CPC ... B60S 5/00; B60S 9/18; B62D 25/18; B60K 35/00; B60J 11/06
See application file for complete search history.

(56) References Cited

U.S. PATENT DOCUMENTS 8,646,952 B2   2/2014   Walden et al.
9,572,298 B2   2/2017   Takaoka et al.

*Primary Examiner* — D Glenn Dayoan
*Assistant Examiner* — Melissa Ann Bonifazi
(74) *Attorney, Agent, or Firm* — Greenblum & Bernstein, P.L.C.

(57) ABSTRACT

A work vehicle includes a vehicle body frame supported on a ground surface via a wheel unit and a pair of left and right fenders that can be reversed from a normal posture to a reversed posture via a reversal mechanism, an inside area covered by the fender under its normal posture becoming exposed in the reversed posture of the fender. The fender is maintained under the normal posture and the reversed posture. A first accommodating profile is formed in the surface of the fender, the first accommodating profile being capable of accommodating an article when the fender assumes the normal posture.

5 Claims, 11 Drawing Sheets

WORK VEHICLE HAVING FENDER

TECHNICAL FIELD

This invention relates to a work vehicle having a fender.

BACKGROUND ART

U.S. Pat. Nos. 8,646,952 and 9,572,298 respectively disclose a mower having fenders disposed upwardly of rear wheels and on the left and right sides of a driver's seat. Each fender is attached to a vehicle body frame with using a fastener such as a bolt and on the top face of the fender, operational levers and operational switches etc. are disposed. Further, on the top face of the fender, a pocket for accommodating a tool, a cup, etc. is formed. Rearwardly of the driver's seat, there is disposed a power source including an engine, engine accessories, etc. Therefore, the fender serves as a dustproof cover for preventing entrance of cut grass clippings, sand dust or the like into the power source or the driver's seat.

The fender serving also as a dustproof cover for the power source or the like can be an obstacle for maintenance. So, at time of maintenance operation, the fender needs to be removed troublesomely and it needs to be attached again after completion of the maintenance operation.

SUMMARY OF THE INVENTION

In view of the above-described state of the art, an object of the present invention is to provide a work vehicle that facilitates maintenance of the area covered by the fender.

A work vehicle according to the present invention includes a wheel unit, a vehicle body frame supported on a ground surface via the wheel unit, and a pair of left and right fenders that can be reversed from a normal posture to a reversed posture via a reversal mechanism. Each fender is reversible from the normal posture to the reversed posture via the reversal mechanism. An inside area covered by the fender under its normal posture becomes exposed in the reversed posture of the fender. The fender is maintained under the normal posture by a first maintaining mechanism. The fender is maintained under the reversed posture by a second maintaining mechanism. In the surface of the fender, there is formed a first accommodating profile capable of accommodating an article when the fender assumes the normal posture.

The reversal mechanism can be constituted of a pivotal shaft extending in a vehicle body front/rear direction. With this arrangement, posture reversal of the fender from the normal posture to the reversed posture is possible by its pivotal movement about the pivot shaft. As the fender extends to follow the circumference of the wheel, its general contour has a rectangular shape elongate in the vehicle body front/rear direction. Thus, the extending of the pivot shaft in the vehicle body front/rear direction provides an advantage of reducing the radius of pivoting path at the time of the pivotal movement.

With the above-described fender arrangement, at time of a maintenance operation, the fender will be displaced from the normal posture to the reversed posture, whereby the inner area (an engine, a transmission, etc.) which has been covered by the fender under the normal posture can now be exposed. As a result, dust, grass, etc. accumulated on the inside area can be removed easily. Further, a working space needed for e.g. adjustment of a control device for the engine, the transmission etc. can be enlarged advantageously.

In the surface of the fender, there is formed a first accommodating profile capable of accommodating an article(s) when the fender assumes the normal posture, the profile being shaped like a geometric profile. Its recess is used as a "pocket" for accommodating an article (or articles) such as a tool, a cup, etc. When the fender is reversed or turned upside down, the pocket is oriented downwards, making article accommodation therein impossible. However, according to one preferred embodiment of the present invention, a second accommodating profile, in the form of e.g. a geometric profile, is formed in the back face of the fender, which allows article accommodation when the fender assumes the reversed posture. Therefore, a maintenance tool, etc. can be accommodated in this second accommodating profile. More particularly, this second accommodating profile allows accommodation of many maintenance tools for selective and frequent use. Moreover, as this second accommodating profile is located close to the inside area of the vehicle body as a target of maintenance, a maintenance operation is facilitated.

At the time of maintenance, in order to secure a large working space for the maintenance operation, it is desired that the fender be located at a position as far as possible from the vehicle body (wheel). Conversely, in the course of traveling, in order to avoid accidental contact with an obstacle, it is desired that the fender be located on as far inner side as possible of the vehicle body (wheel). For this reason, according to one preferred embodiment of the present invention, the fender, when assuming the normal posture, is located on more inner side than an outer contour of the wheel unit (generally, left and right rear wheels) in the vehicle body transverse direction and the fender, when assuming the reversed posture, is located on more outer side than the contour of the wheel unit in the vehicle body transverse direction.

DETAILED DESCRIPTION

Next, an embodiment of a riding type mower as one embodiment of a work vehicle relating to the present invention will be explained. Incidentally, in this detailed description, unless indicated otherwise, a word "front" means the front (forward) side with respect to a vehicle body front/rear direction (traveling direction). A word "rear" means the rear (rearward or reverse) side with respect to the vehicle body front/rear direction (traveling direction). Further, a language "left/right direction" or "lateral direction" means a vehicle body transverse direction (vehicle body width direction) perpendicular to the vehicle body front/rear direction. Also, a word "upper" and a word "lower" respectively refer to positional relationship in the perpendicular direction (vertical direction) of the vehicle body, indicating relationship in terms of ground clearance height.

Figure 1:
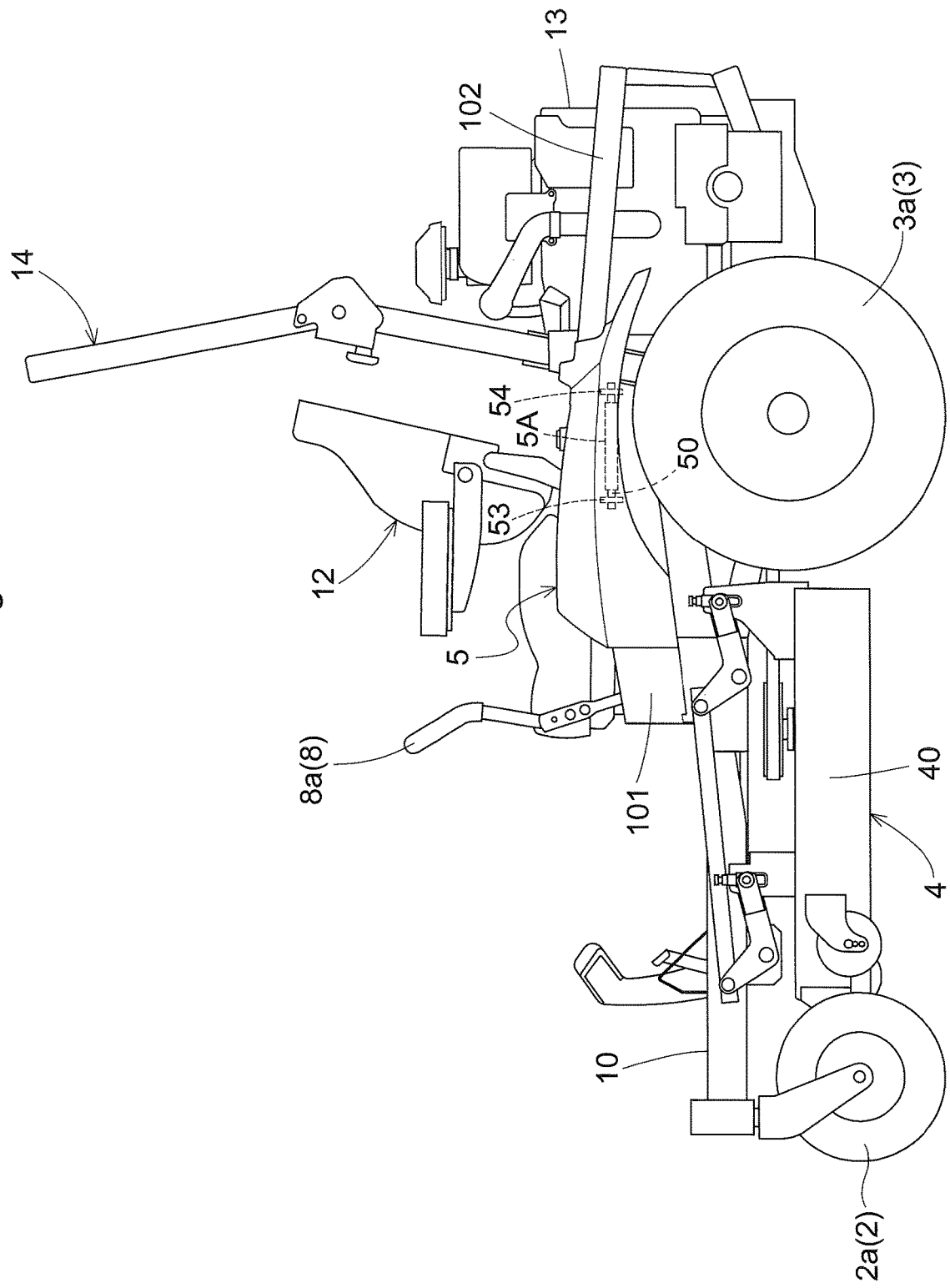
FIG. 1 is a side view of a mower having fenders according to a first embodiment.
Figure 2:
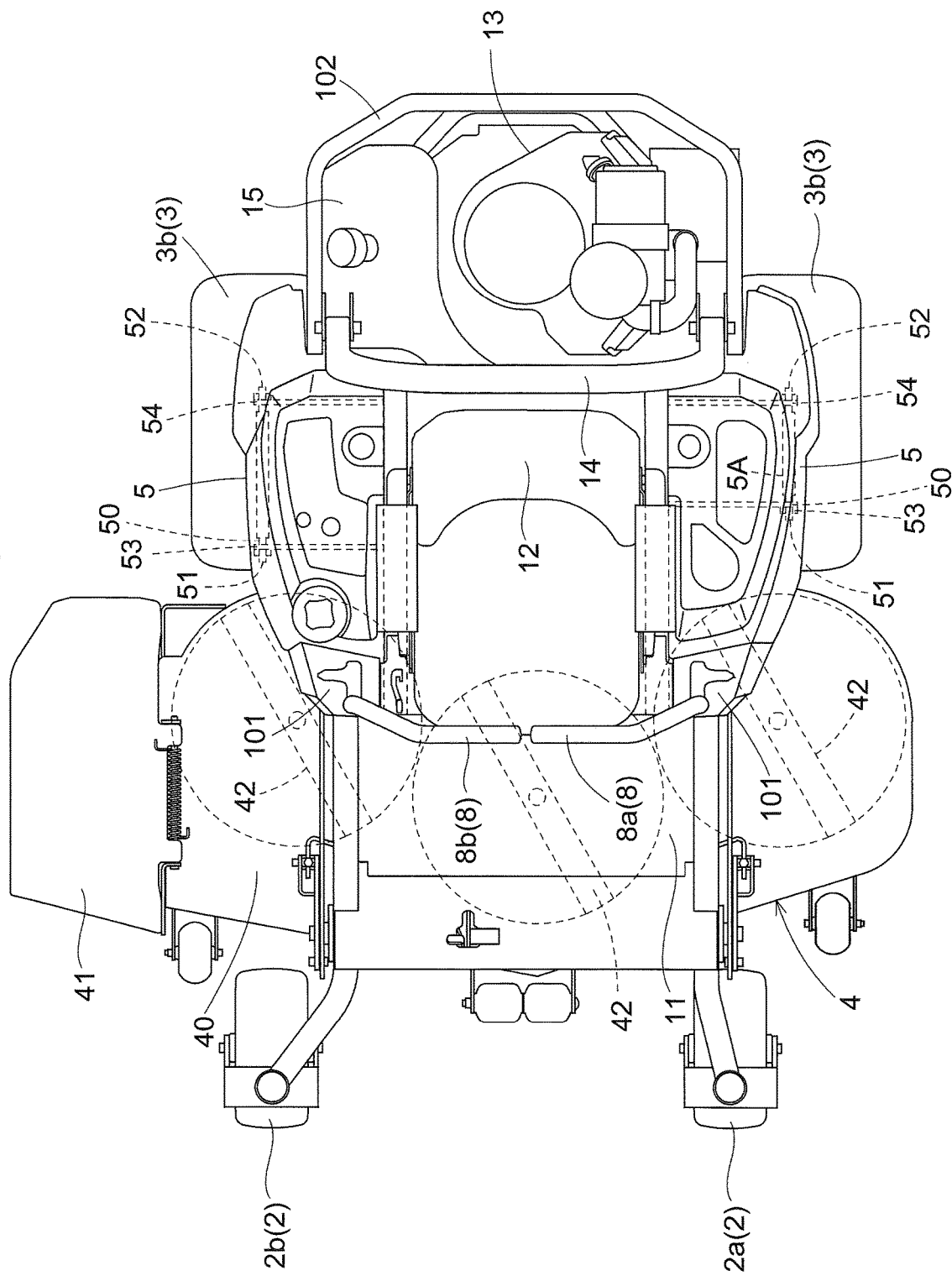
FIG. 2 is a plan view of the mower having the fenders according to the first embodiment.
Figure 3:
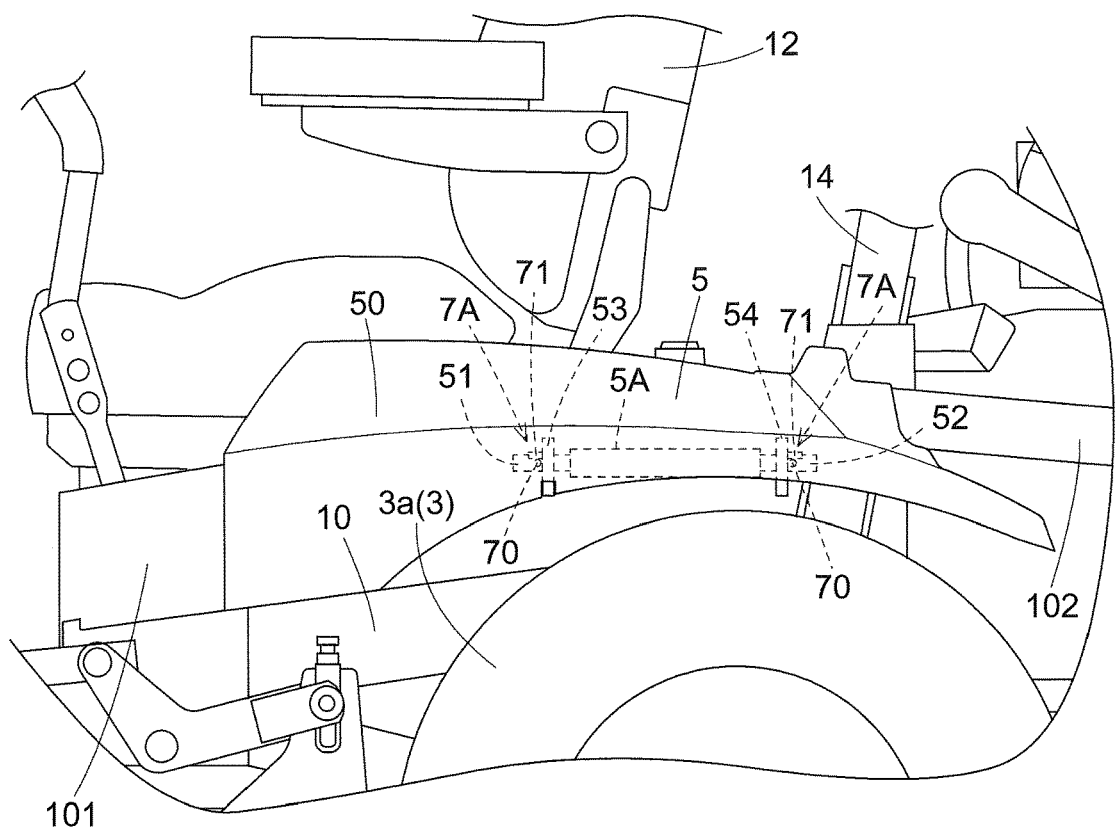
FIG. 3 is a side view of the fender according to the first embodiment.
Figure 4:
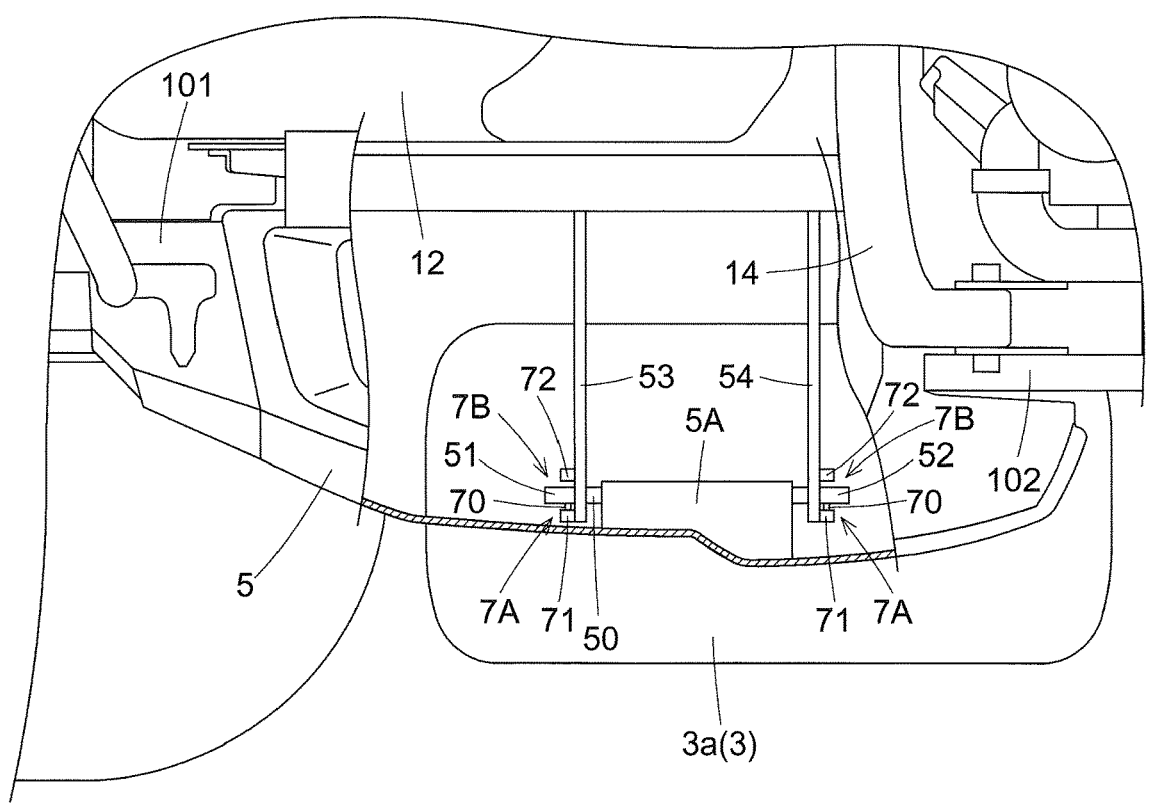
FIG. 4 is a plan view of the fender according to the first embodiment.

As shown in FIG. 1 and FIG. 2, this mower includes a vehicle body frame 10 supported on a ground surface via a front wheel unit 2 as a caster unit and a rear wheel unit 3 as driving wheels. This mower is a so-called zero-turn mower with a left rear wheel 3a and a right rear wheel 3b together constituting the rear wheel unit 3 being independently speed-controlled in the forward and reverse directions. The front wheel unit 2 includes a pair of left and right front wheels 2a, 2b. The vehicle body frame 10 is formed of a pair of left and right longitudinal frames extending in the vehicle body front/rear direction and cross beams extending in the vehicle body transverse direction to interconnect the longitudinal frames and formed of angular pipes or plate members. Between the front wheel unit 2 and the rear wheel unit 3, a mower unit 4 is suspended from the vehicle body frame 10 to be liftable up/down.

At a center portion of the vehicle body frame 10, a driver's seat 12 is provided. As no cabin (no canopy) is mounted, the driver's seat 12 is exposed to the outside. As shown in FIG. 2, on the upper face of the front portion of the vehicle body frame 10, there is laid a floor plate 11 for use as a "footrest" for the driver. In the inclined front area of the floor plate 11, foot operational tools are disposed. At the rear portion of the vehicle body frame 10 rearwardly of the driver's seat 12, there are disposed an engine 13 as an internal combustion engine, a fuel tank 15, and so on.

A maneuvering unit 8 as one user operable device consists of a left maneuvering lever 8a disposed on the left side of the driver's seat 12 and a right maneuvering lever 8b disposed on the right side of the driver's seat 12. The left maneuvering lever 8a is used for adjusting a rotational speed of the left rear wheel 3a. The right maneuvering lever 8b is used for adjusting a rotational speed of the right rear wheel 3b. And, the left maneuvering lever 8a and the right maneuvering lever 8b are respectively operable over and across a forward traveling speed changing range, a neutral and a reverse traveling speed changing range.

On the left and right opposed sides of the driver's seat 12, there are provided rear wheel fenders (to be referred to simply as "fenders" hereinafter) 5. In the upper face of each fender 5, there are formed recesses for accommodating article(s), and a platform for appropriately disposing thereon the user operable devices such as the various operational levers, operational buttons, etc. Rearwardly of the driver's seat 12, an arch-shaped ROPS 14 is mounted vertically.

The mower unit 4 includes a side-discharge type mower deck 40 and a discharger cover 41 disposed on a grass clipping discharging side of the mower deck 40. In the inner space of the mower deck 40, there are provided three blades 42 that are disposed side by side in the vehicle body transverse direction. The blades 42 are rotated by PTO power from the engine 13.

Power from the engine 13 is transmitted via an unillustrated traveling transmission including a pair of left and right HST's (hydrostatic transmissions) to the left rear wheel 3a and the right rear wheel 3b independently. Speed changing ratios including forward traveling, reverse traveling and the neutral are adjusted based on pivotal operations of the left maneuvering lever 8a and the right maneuvering lever 8b. More particularly, in response to user operations on the left maneuvering lever 8a and the right maneuvering lever 8b, a stopped state, a straight traveling state, a gentle turning state, a pivot turning stage and a spin turning state can be realized respectively. The stopped state is realized by stopping the left rear wheel 3a and the right rear wheel 3b. The straight traveling state is realized by driving the left rear wheel 3a and the right rear wheel 3b at an equal speed forwardly or reversely. The gentle turning state is realized by driving the left rear wheel 3a and the right rear wheel 3b at different speeds forwardly or reversely. The pivot turning state is realized by stopping one of the left rear wheel 3a and the right rear wheel 3b and driving the other forwardly or reversely. The spin turning state is realized by driving one of the left rear wheel 3a and the right rear wheel 3b forwardly and driving the other thereof reversely.

Figure 5:
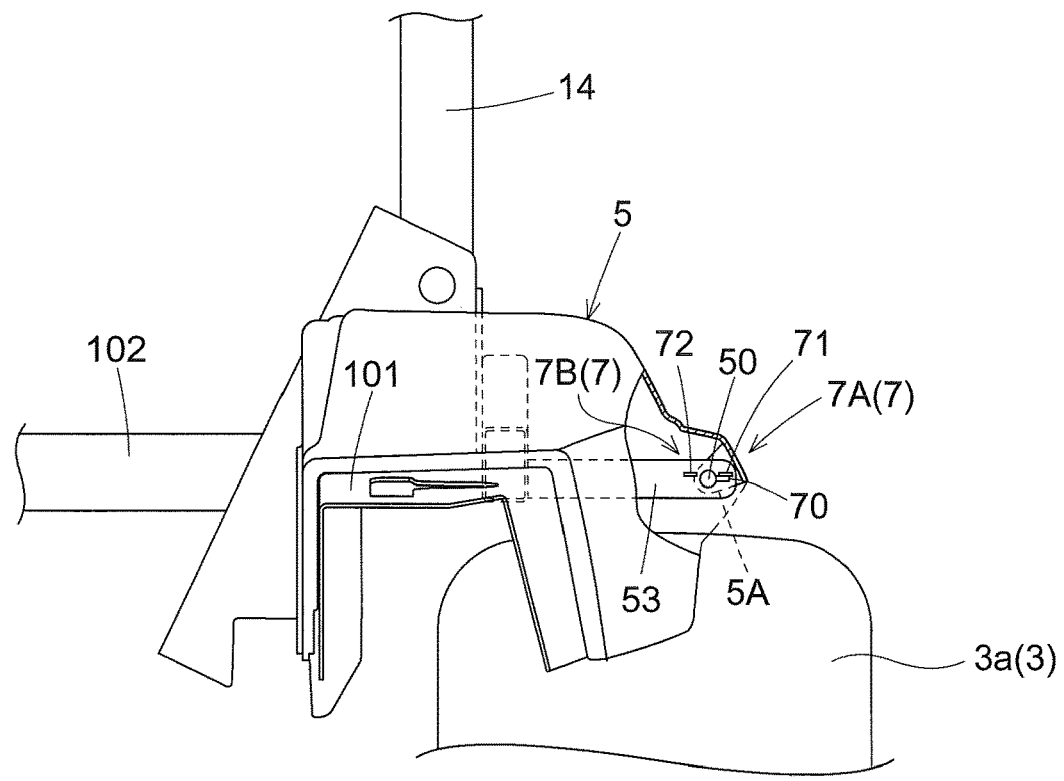
FIG. 5 is a front view of the fender under a normal posture.
Figure 6:
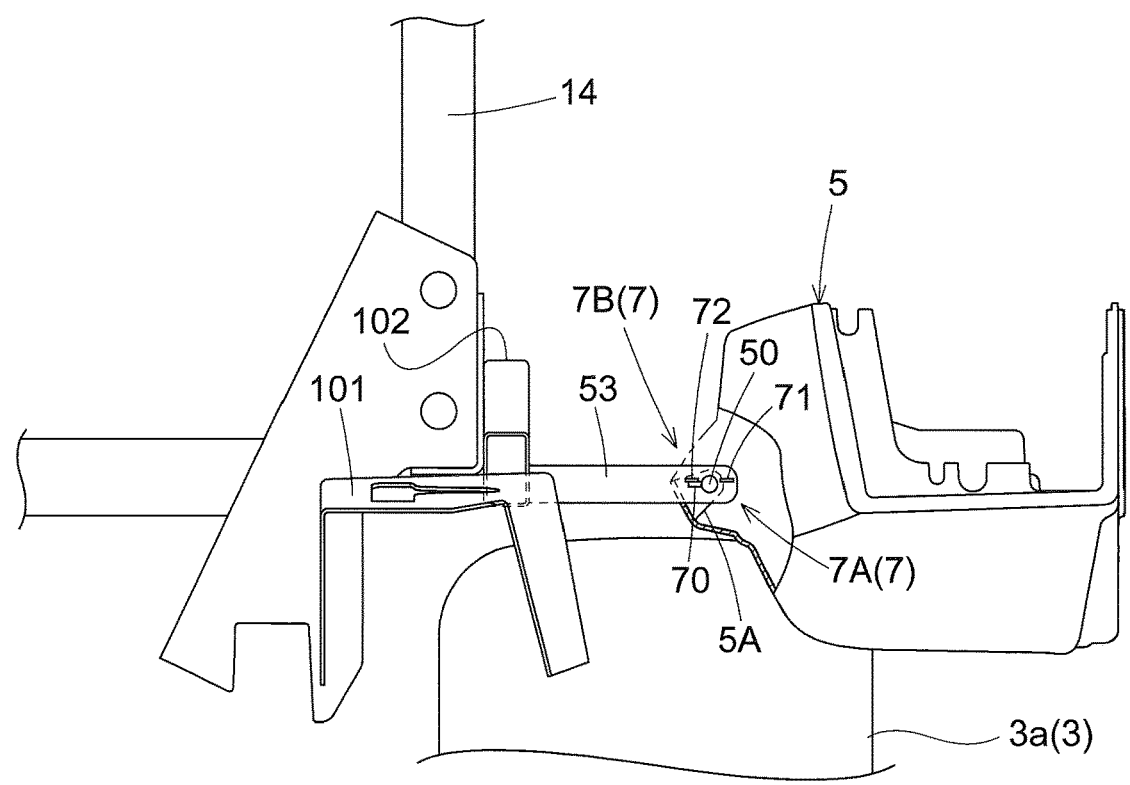
FIG. 6 is a front view of the fender under a reversed posture.
Figure 7:
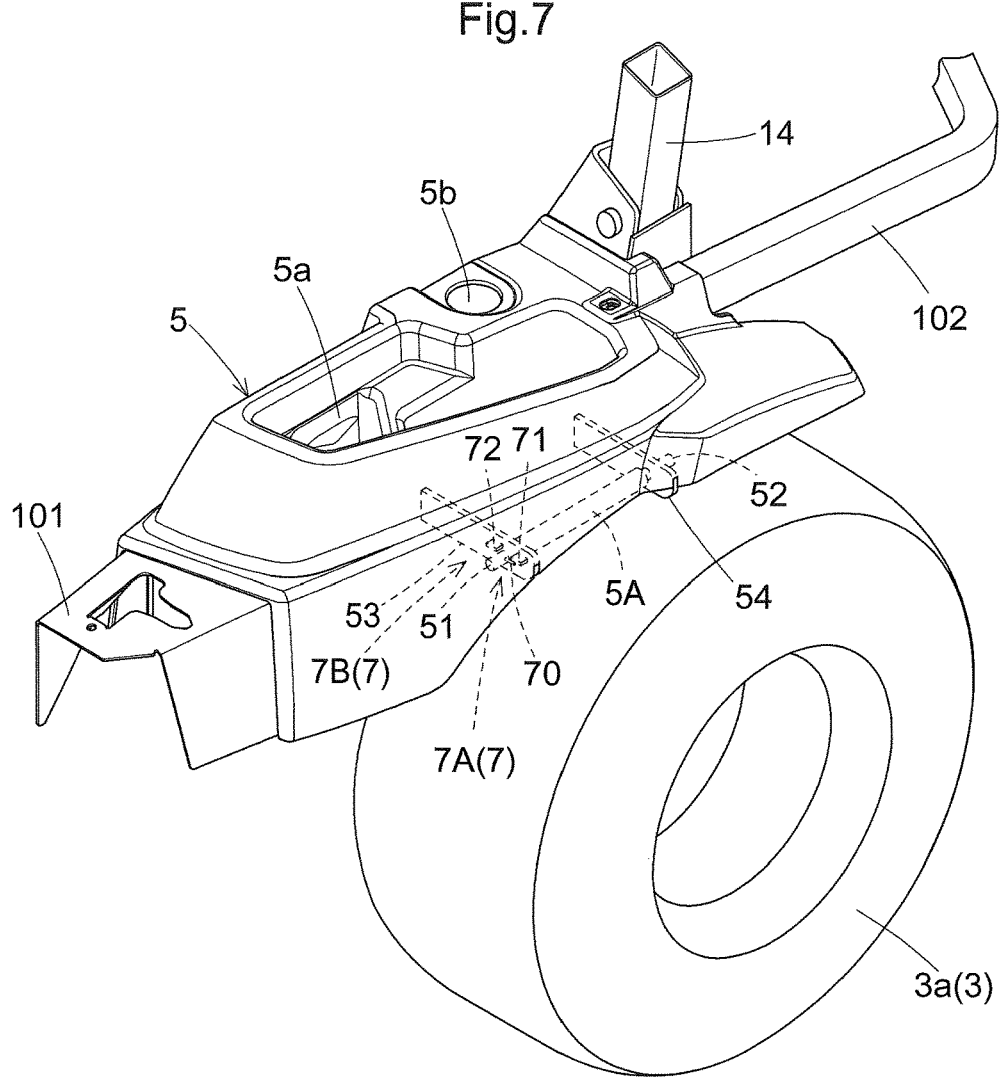
FIG. 7 is a perspective view showing a pivot mechanism of the fender.

The fender 5 shown in FIGS. 3 through 10 is pivotable between a normal posture and a reversed posture. The lower face of the fender 5 is formed of one or more resin molded elements and provides a function of preventing dust or pebbles flipped up by the rear wheel unit 3 from being scattered to the surrounding. As shown in FIG. 7, in the upper face of the fender 5 assuming the normal posture, an uneven profile is formed. Its recesses 5a, 5c are formed as a first accommodating profile for use as an article accommodating pocket. Its protruding portion is used as a mounting platform for a control panel or operational tools.

To the fender 5, there is attached a pivot shaft 50 which extends in the vehicle body front/rear direction and which serves as a "reversal mechanism" for switching the fender 5 from the normal posture to the reversed posture. The pivot shaft 50 is engaged and fixed in a hole extending in the vehicle body front/rear direction in a flange 5A formed in the back face of the fender 5 at the outermost portion in the vehicle body transverse direction. A front portion 51 of the pivot shaft 50 protruding from the front end of the flange 5A is supported and received by a front support 53. And, a rear portion 52 of the pivot shaft 50 protruding from the rear end of the flange 5A is supported and received by a rear support 54.

As shown in FIG. 5 and FIG. 6, the front support 53 and the rear support 54 respectively has its one end fixed to the vehicle body frame 10 and extends to the outer side in the vehicle body transverse direction. At the other ends of the front support 53 and the rear support 54, boss holes 63 (see FIG. 8) are formed. Into these boss holes 63, the front portion 51 and the rear portion 52 of the pivot shaft 50 are inserted. The pivot shaft 50 is rotatably supported in the boss holes 63 of the front support 53 and the rear support 54. With this arrangement, the fender 5 can pivot about the pivot shaft 50, thus being switched in its posture between the normal posture and the reversed posture.

The pivotal range of the fender 5 is limited by a maintaining mechanism 7. This maintaining mechanism 7 consists of a first maintaining mechanism 7A for maintaining the fender 5 at a pivot angle at which the fender 5 assumes the normal posture and a second maintaining mechanism 7B for maintaining the fender 5 at a pivot angle at which the fender 5 assumes the reversed posture. The angle (the pivotable angular range) between the pivot angle where the fender 5 assumes the normal posture and the pivot angle where the fender 5 assumes the reversed posture is set as substantially 180 degrees in this embodiment.

Figure 8:
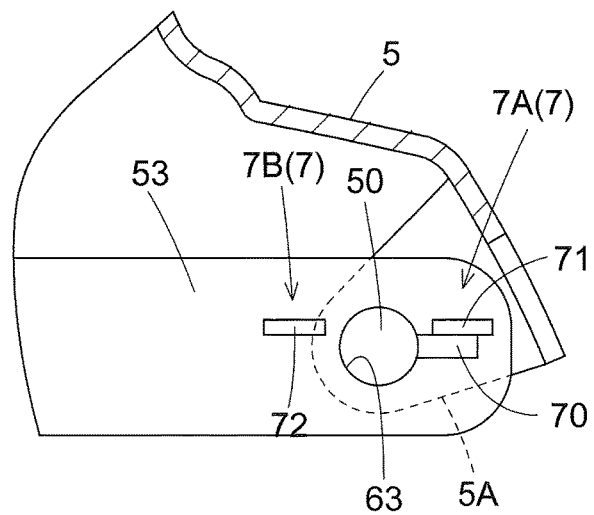
FIG. 8 is a schematic of a maintaining mechanism which maintains the fender under the normal posture.
Figure 9:
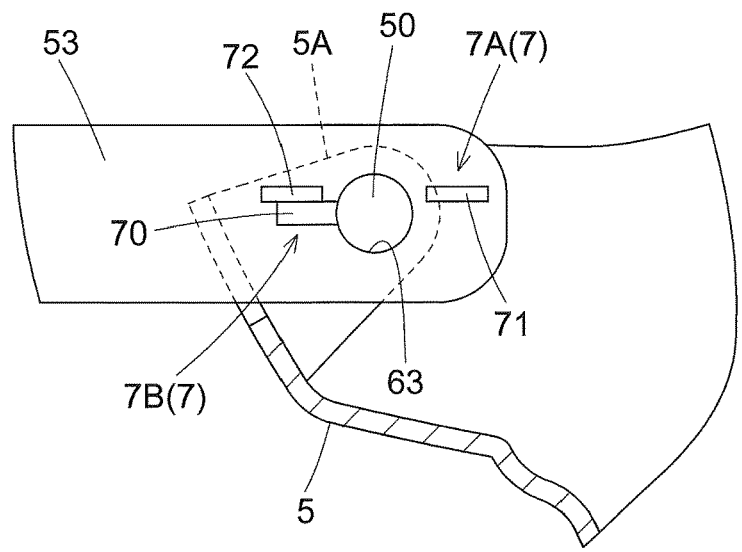
FIG. 9 is a schematic of a maintaining mechanism which maintains the fender under the reversed posture.

In this embodiment, as shown in FIG. 8 and FIG. 9, the maintaining mechanism 7 is provided between the front support 53 and/or the rear support 64 and the pivot shaft 50. The maintaining mechanism 7 consists of a stopper pin 70, a first stopper 71 and a second stopper 72. The stopper pin 70 is inserted and fixed to the pivot shaft 50 in its radial direction. The first stopper 71 and the second stopper 72 are fixed to the front support 53 and/or the rear support 54. The first stopper 71 and the second stopper 72 are fixed in position so as to come into contact with the stopper pin 70 in association with rotation of the pivot shaft 50 and limit the rotational range of the pivot shaft 50, namely, the pivotal angle range of the fender 5.

The first maintaining mechanism 7A consists of the stopper pin 70 and the first stopper 71; and the second maintaining mechanism 7B consists of the stopper pin 70 and the second stopper 72. Thus, the stopper pin 70 is a constituent member shared by the first maintaining mechanism 7A and the second maintaining mechanism 7B. The first stopper 71 comes into contact with the stopper pin 70 when the fender 5 assumes the normal posture. Due to the gravity center position of the fender 5 relative to the pivot shaft 50, under the normal posture, in the stopper pin 70, there is developed a force for pressing the first stopper 71, so that the fender 5 is maintained under the normal posture (see FIG. 8). The second stopper 72 comes into contact with the stopper pin 70 when the fender 5 assumes the reversed posture. Under this reversed posture, in the stopper pin 70, there is developed a force for pressing the first pin 71, so that the fender 5 is maintained under the reversed posture due to the gravity (see FIG. 9). In order to avoid movements of the fenders 5 in the course of traveling, fixing tools, e.g. stopper pins, quick clamps, etc., will be used for at least fixing the fenders 5 under the normal posture.

Figure 10:
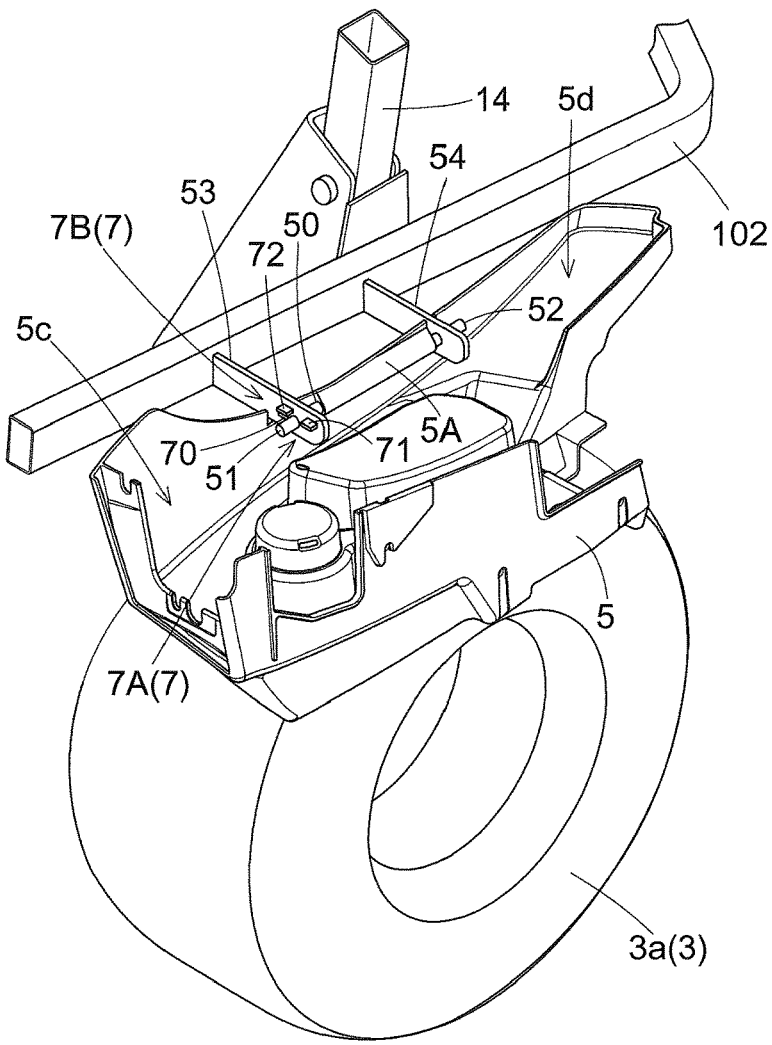
FIG. 10 is a perspective view of the fender under the reversed posture.
Figure 11:
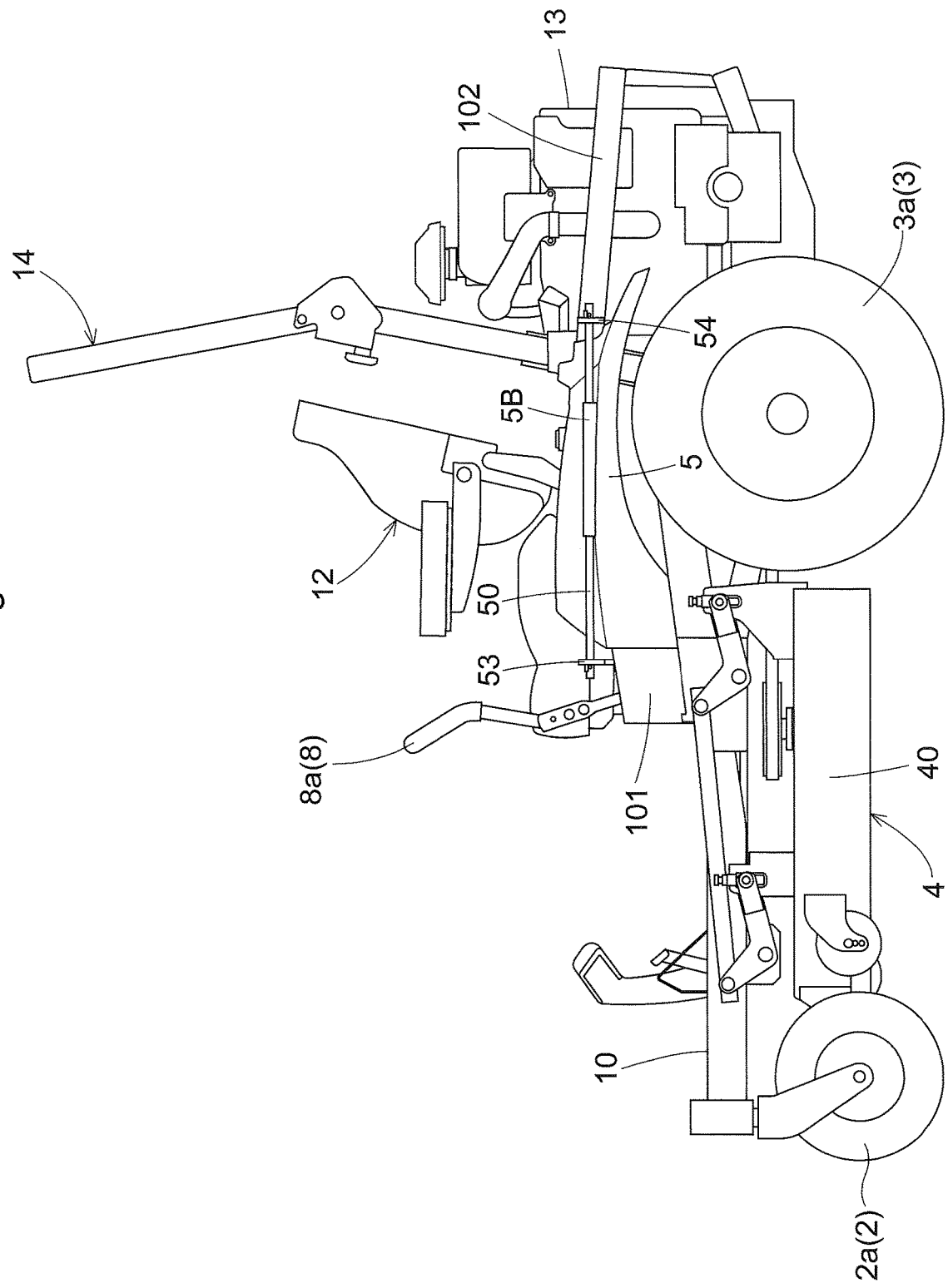
FIG. 11 is a side view of the mower having fenders according to a second embodiment.
Figure 12:
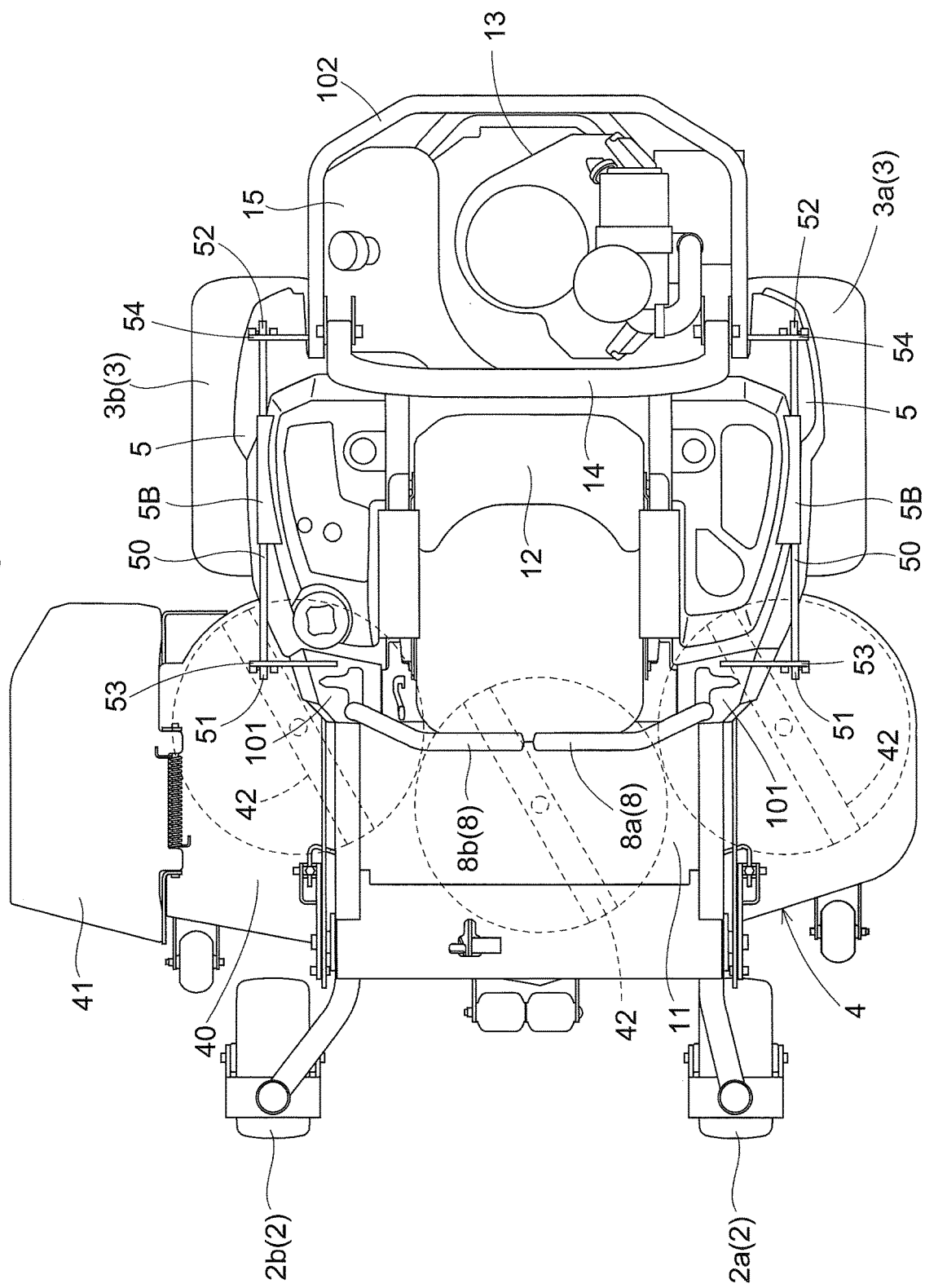
FIG. 12 is a plan view of the mower having the fenders according to the second embodiment.
Figure 13:
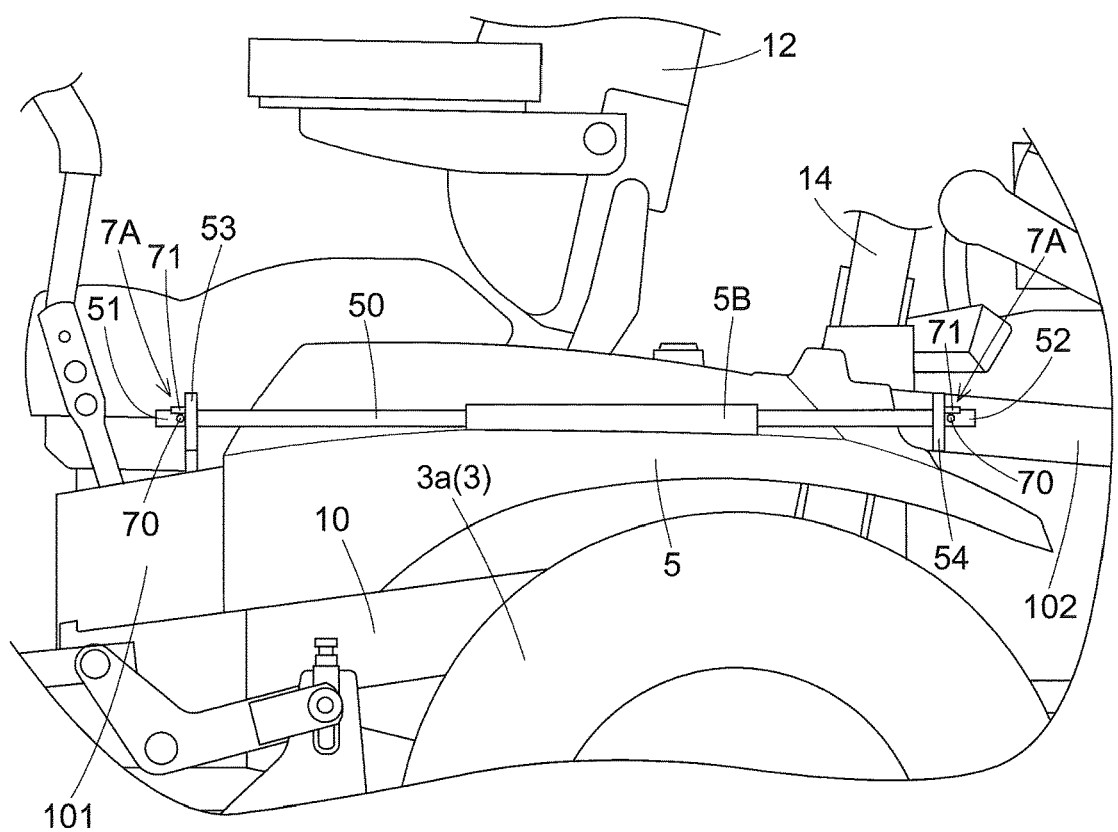
FIG. 13 is a side view of the fender according to the second embodiment.
Figure 14:
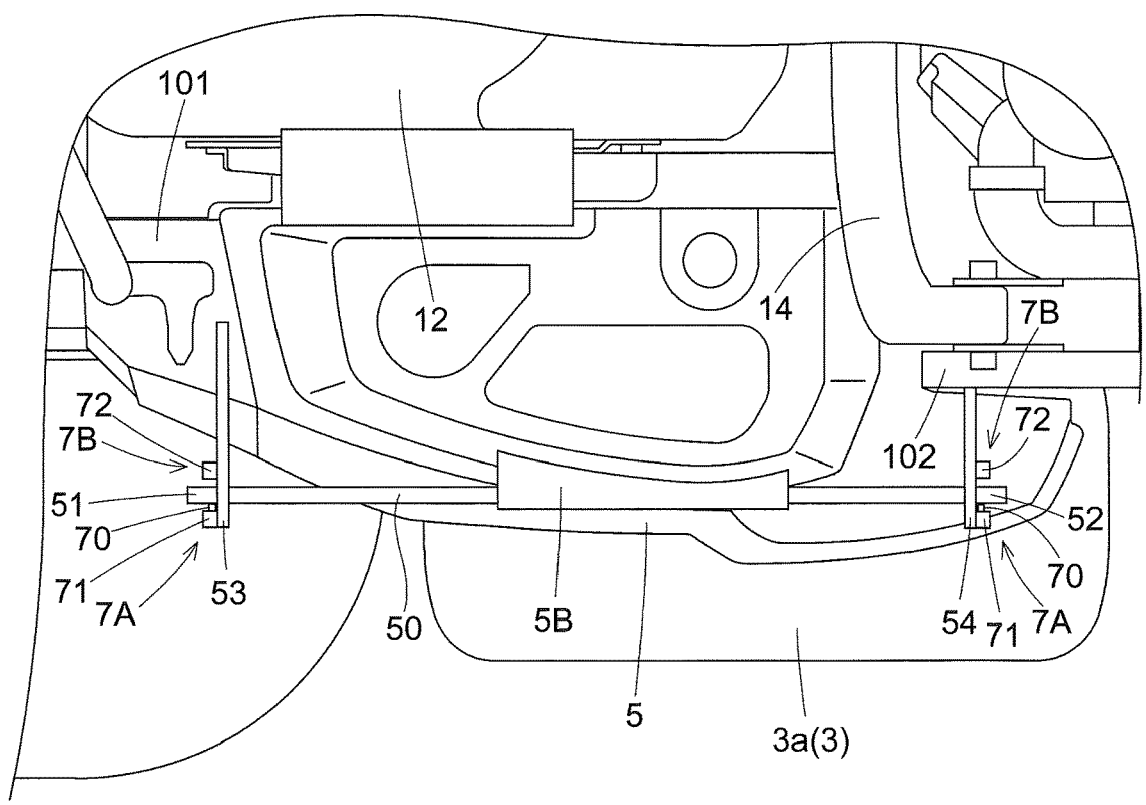
FIG. 14 is a plan view of the fender according to the second embodiment.

As shown in FIG. 10, in the top face of the fender 5 assuming the reversed posture, recesses 5c, 5d are formed as a "second accommodating profile". And, these recesses 5c, 5d are opened to the upper side and in these, tools used in maintenance or articles can be placed (accommodated). The fender 5 assuming the normal posture is located on more inner side than the rear wheel unit 3 in the vehicle body transverse direction, whereas the fender 5 assuming the reversed posture is located on more outer side than the rear wheel unit 3 in the vehicle body transverse direction. Namely, when the fender 5 is pivoted from the normal posture to the reversed posture, most of the space previously occupied by this fender 5 assuming the normal posture will now become available as a space that provides access to the inside of the vehicle body from the outside. In this, as the fender 5 under the reversed posture is located adjacent such access space, it can be used conveniently as a placing space for the tools for maintenance, etc.

FIGS. 11 through 16 show a further embodiment of the reversal mechanism for switching the fender 5 from the normal posture to the reversed posture. In this reversal mechanism, its pivot shaft 50 is longer than the one used in the foregoing embodiment. A flange 50B for fixing the pivot shaft 50 to the fender 5 is formed in the surface of the fender 5. A front support 53 which supports and receives a front portion 51 of the pivot shaft 50 protruding from the front end of the flange 5B extends in the vehicle body transverse direction in front of the fender 5. A rear support 54 which supports and receives a rear portion 52 of the pivot shaft 50 protruding from the rear end of the flange 5B extends in the vehicle body transverse direction behind the fender 5.

Figure 15:
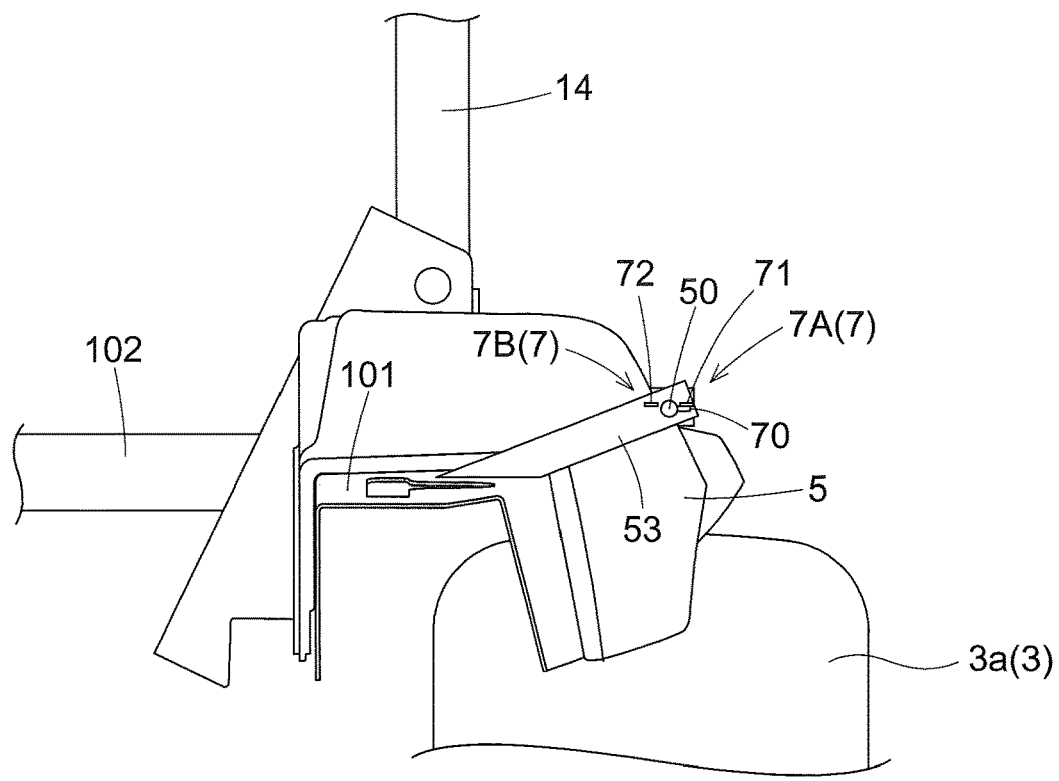
FIG. 15 is a front view of the fender under the normal posture.
Figure 16:
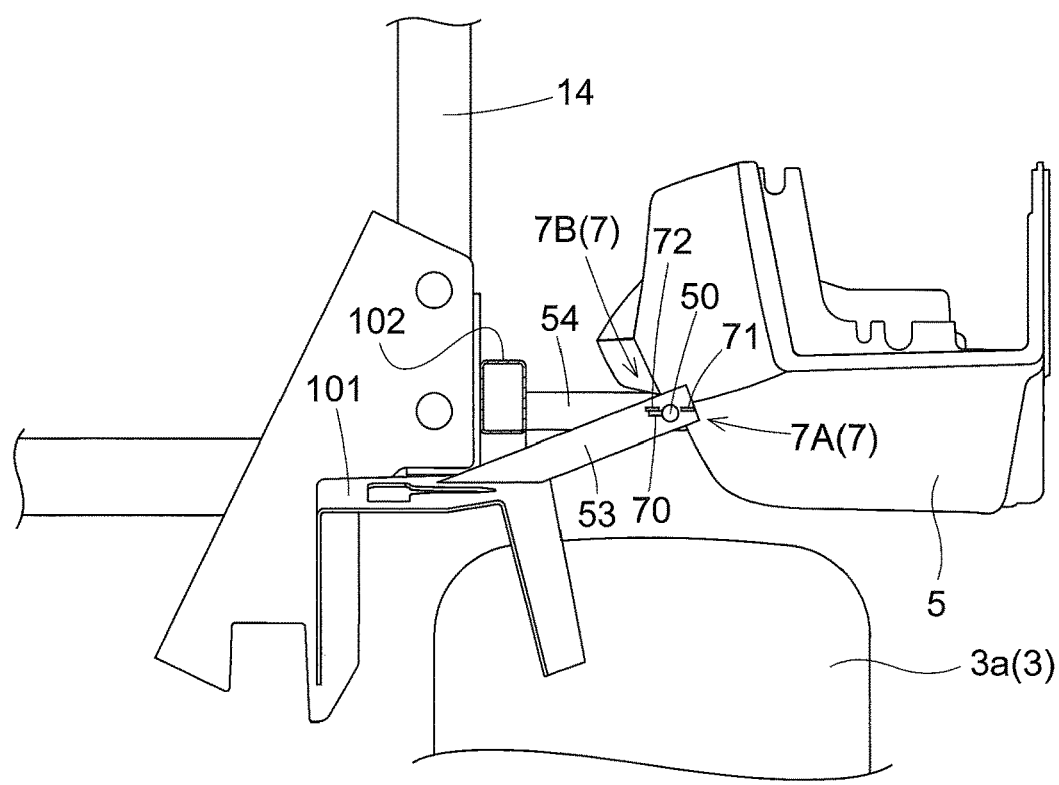
FIG. 16 is a front view of the fender under the reversed posture.

As shown in FIG. 15 and FIG. 16, the front support 53 and the rear support 54 extend above the upper face of the fender 5 and are fixed to the vehicle body frame 10. In either case, with this arrangement, the fender 5 can pivot about the pivot shaft 50 and can be switched over in its posture between the normal posture and the reversed posture.

A first maintaining mechanism 7A for maintaining the fender 5 under the normal posture and a second maintaining mechanism 7B for maintaining the fender 5 under the reversed posture are substantially identical to the ones shown in the foregoing embodiment, so detailed explanation thereof will be omitted here.

Figure 17:
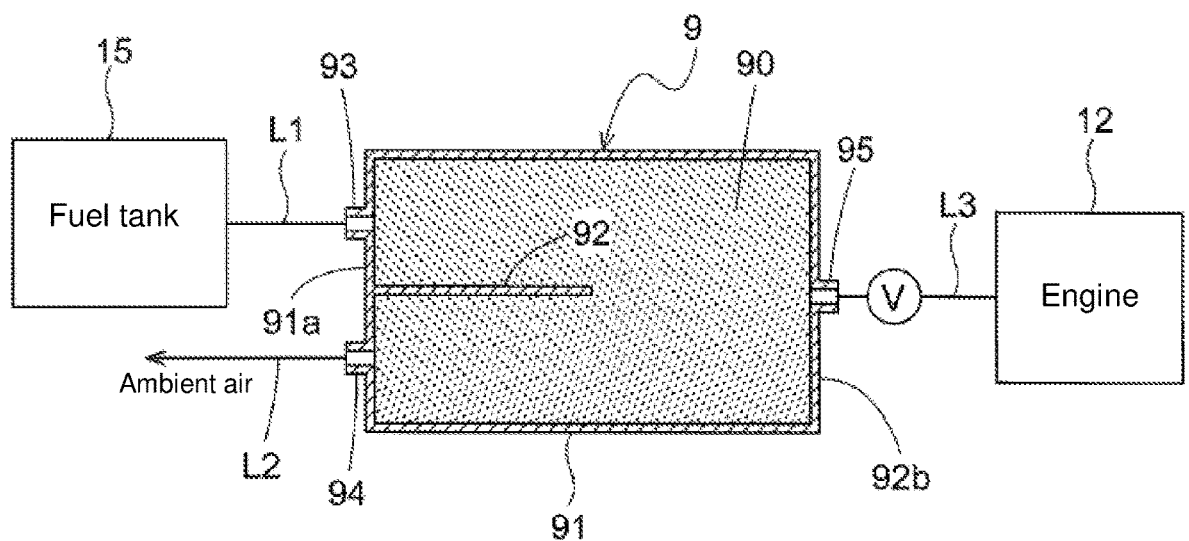
FIG. 17 is a schematic cross sectional view showing an arrangement of a canister.

In order to prevent leakage of fuel vapor generated inside the fuel tank 15 to the outside, a carbon canister 9 schematically shown in FIG. 17 is provided between the fuel tank 15 and the engine 13. This carbon canister 9 comprises a housing 91 incorporating an adsorbent (carbon) unit 90 for adsorbing fuel vapor. The housing 91 has a rectangular or cylindrical shape and includes a group of ports for establishing communication between the outside and the inside, formed in a first end face 91a and a second end face 91b thereof opposed to each other. More particularly, in the first end face 91a, a tank port 93 and an ambient air port 94 are provided in a spaced relationship from each other and in the second end face 91b, a purge (engine) port 95 is provided. A partition wall 92 for partitioning the tank port 93 from the ambient air port 94 extends from the first end face 91a to the second end face 91b. The length of the partition wall 92 illustrated in FIG. 17 is from ⅓ to ½ of the distance between the first end face 91a and the second end face 91b. The tank port 93 and the fuel tank 15 are connected to each other via a fuel vapor passage L1. An ambient air passage L2 that communicates the ambient air port 94 with ambient air can incorporate a filter. A purge passage L3 that connects the purge port 95 with the engine 13 incorporates a purge valve V.

With the above-described port arrangement and formation of the partition wall 92 in operation, fuel vapor will flow in the housing 91 along its substantially entire length while being adsorbed by the adsorbent unit 90. Direct introduction of fuel vapor flown via the tank port 93 into the ambient air port 94 is prevented by the partition wall 92.

In the foregoing embodiment, a zero turn mower was used as a work vehicle. Needless to say, the inventive fender arrangement can be used in other type of mower or even in an agricultural work vehicle such as a tractor or a civil engineering work vehicle also.

In the meantime, the arrangements disclosed in the foregoing embodiment (including the further embodiment) can be used in combination with arrangements disclosed in the other embodiments as long as such combination does not result in contradiction. Further, it is understood that the embodiments disclosed in this detailed disclosure are only illustrative, and the scope of the present invention is not limited thereto. In fact, various modifications can be made appropriately within a range not deviating from the essence of the invention.

The invention claimed is:

1. A work vehicle comprising:
   a wheel unit;
   a vehicle body frame supported on a ground surface via the wheel unit;
   a pair of left and right fenders that can be reversed from a normal posture to a reversed posture via a reversal mechanism, an inside area covered by the fender under its normal posture becoming exposed in the reversed posture of the fender;
   a first maintaining mechanism for maintaining the fender under the normal posture;
   a second maintaining mechanism for maintaining the fender under the reversed posture; and
   a first accommodating profile formed in the surface of the fender and capable of accommodating an article when the fender assumes the normal posture.

2. The work vehicle of claim 1, wherein the reversal mechanism is constituted of a pivotal shaft extending in a vehicle body front/rear direction, the fender being reversed about the pivotal shaft from the normal posture to the reversed posture.

3. The work vehicle of claim 1, wherein a second accommodating profile which allows article accommodation when the fender assumes the reversed posture is formed in the back face of the fender.

4. The work vehicle of claim 3, wherein the second accommodating profile is suitable for accommodation of maintenance tool.

5. The work vehicle of claim 3, wherein the fender, when assuming the normal posture, is located on more inner side than an outer contour of the wheel unit in the vehicle body transverse direction and the fender, when assuming the reversed posture, is located on more outer side than the contour of the wheel unit in the vehicle body transverse direction.

* * * * *